United States Patent [19]

Henze

[11] 3,974,978
[45] Aug. 17, 1976

[54] ANTI-REVERSE MECHANISM FOR FISHING REELS

[75] Inventor: Herbert O. Henze, Philadelphia, Pa.

[73] Assignee: Penn Fishing Tackle Mfg. Co., Philadelphia, Pa.

[22] Filed: Aug. 21, 1975

[21] Appl. No.: 606,422

[52] U.S. Cl. .................. 242/84.1 R; 74/576; 188/82.3; 188/82.4; 188/82.7
[51] Int. Cl.² .......... A01K 89/01; A01K 89/02; F16D 63/00; G05G 1/00
[58] Field of Search ........... 242/84.1 R, 84.2 A, 242/84.2 R, 84.2 G, 84.21 R, 217, 218, 219, 211, 84.5 R; 74/576; 188/82.3, 82.7, 82.4, 82.5

[56] References Cited
UNITED STATES PATENTS

| 876,752 | 1/1908 | Waldron | 74/576 |
| 1,991,407 | 2/1935 | Miller et al. | 242/218 |
| 3,167,272 | 1/1965 | Frode | 242/219 X |
| 3,291,452 | 12/1966 | Rau et al. | 188/82.5 X |

FOREIGN PATENTS OR APPLICATIONS

| 602,922 | 6/1948 | United Kingdom | 242/84.21 R |

Primary Examiner—Billy S. Taylor
Attorney, Agent, or Firm—Zachary T. Wobensmith, 2nd; Zachary T. Wobensmith, III

[57] ABSTRACT

Anti-reverse mechanism for fishing reels is provided which includes a notched wheel having a pair of dogs resiliently urged into engagement therewith, one dog having an anti-torque spring to produce silent operation and the other dog as it is urged into engagement with the wheel producing an audible sound.

The silent dog is engaged by a cam which urges it out of wheel engagement and which through an arm urges the audible dog out of engagement for reverse wheel movement. The audible dog can also be urged out of engagement by a cam thereby permitting selective silent or audible anti-reverse action as desired.

The foregoing abstract is not to be taken as limiting the scope of my invention and in order to understand the full nature and extent of the technical disclosure of this patent reference must be made to the accompanying drawings and the following detailed description.

5 Claims, 6 Drawing Figures

ANTI-REVERSE MECHANISM FOR FISHING REELS

BACKGROUND OF THE INVENTION

1. Field of the Invention

An anti-reverse mechanism for fishing reels is provided of the type which utilizes resiliently urged dogs to engage a notched wheel permitting one way rotation and to provide an audible signal or not as desired during operation of the mechanism.

2. Description of the Prior Art

In the operation of fishing reels it is desirable to have an anti-reverse mechanism which permits the spool or line spinning mechanism to normally operate in one rotational direction with the capability of selective operation in the opposite rotational direction and with some signal indicating mechanism.

The anti-reverse mechanisms generally available are of the type which provide an audible signal for reel line operation or provide no signal but none of them has the capability of anti-reverse operation with the selection of an audible signal or not as desired.

The anti-reverse mechanism of my invention provides a capability of silent anti-reverse action, audible anti-reverse action and reverse action for the reel line winding mechanism as desired.

SUMMARY OF THE INVENTION

This invention relates to an anti-reverse mechanism for fishing reels which includes a notched wheel attached to the drive shaft of a fishing reel, a pair of dogs resiliently urged into engagement with the wheel, one dog having an anti-torque spring carried therewith which results in silent dog engagement while the other dog causes an audible signal upon engagement with the wheel. A cam is provided which can engage the silent dog and through a cam arm engage the audible dog for disengagement and reverse wheel movement. The audible dog has another cam engageable therewith which can engage it and urge it out of engagement with the wheel to provide for silent dog engagement of the wheel only as desired.

The principal object of the invention is to provide an anti-reverse mechanism for fishing reels that is silent but which can provide an audible signal if desired.

A further object of the invention is to provide an anti-reverse mechanism for fishing reels which can be disengaged to permit reverse action.

A further object of the invention is to provide an anti-reverse mechanism for fishing reels which can be utilized on a wide variety of reels.

A further object of the invention is to provide an anti-reverse mechanism for fishing reels employing a plurality of dogs and thereby providing greater security.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part herein, in which.

Figures 1, 3:
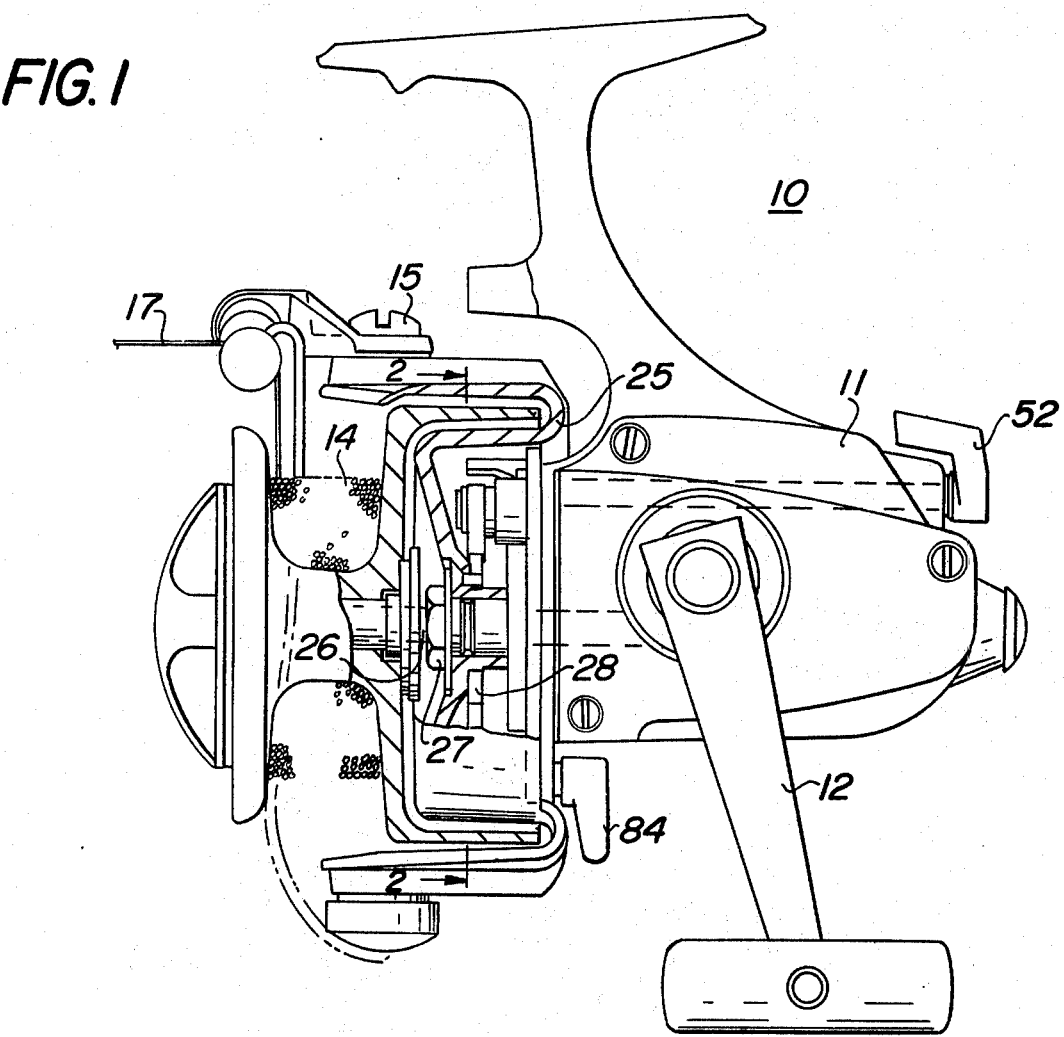
FIG. 1 is a side elevational view of my invention with parts being broken away to show the internal construction.
FIG. 3 is a horizontal sectional view taken approximately on the line 3—3 of FIG. 2.

It should, of course, be understood that the description and drawings herein are illustrative merely and that various modifications and changes can be made in the structure disclosed without departing from the spirit of the invention.

Like numbers refer to like parts throughout the several views.

DESCRIPTION OF THE PREFERRED EMBODIMENT

Referring now more particularly to the drawings a reel 10 of conventional type and illustrated as a spinning reel is shown, which includes an outer housing 11, a handle 12, a spool assembly 14, and a rotating member 15 for winding and unwinding of line 17 onto and from the spool assembly 14. Gear mechanism (not shown) is provided connecting handle 12 and rotating member 15 for rotation.

Figures 2, 4:
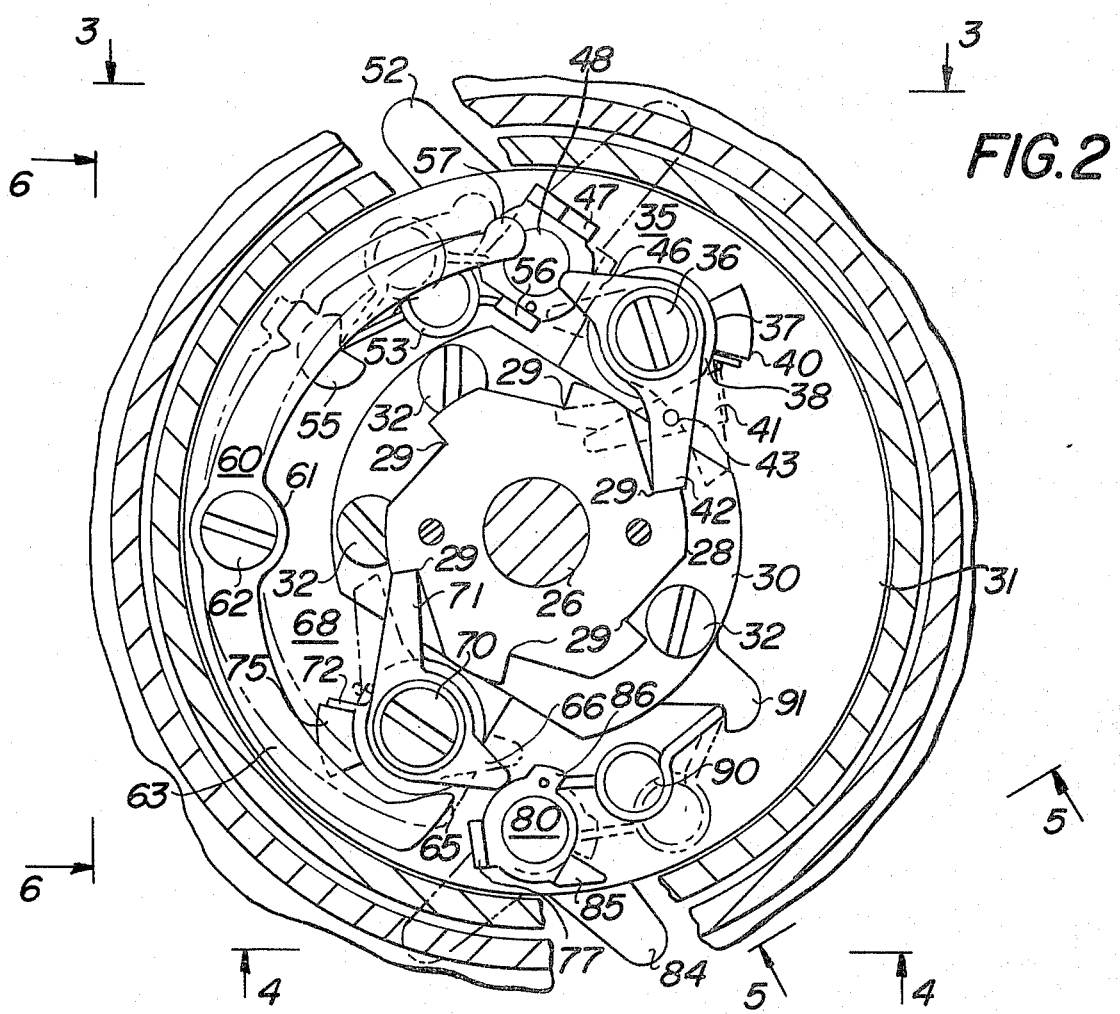
FIG. 2 is a vertical sectional view, enlarged, taken approximately on the line 2—2 of FIG. 1.
FIG. 4 is a horizontal sectional view taken approximately on the line 4—4 of FIG. 2.
Figure 5:
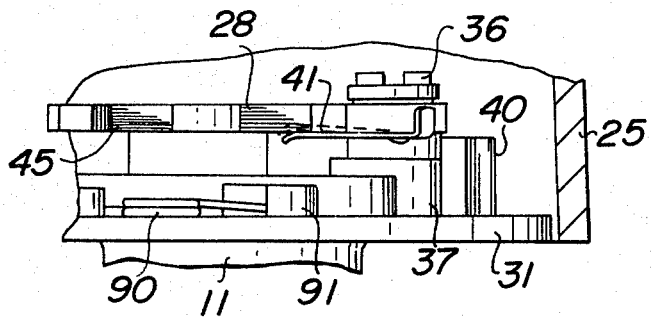
FIG. 5 is a fragmentary sectional view taken approximately on the line 5—5 of FIG. 2.
Figure 6:
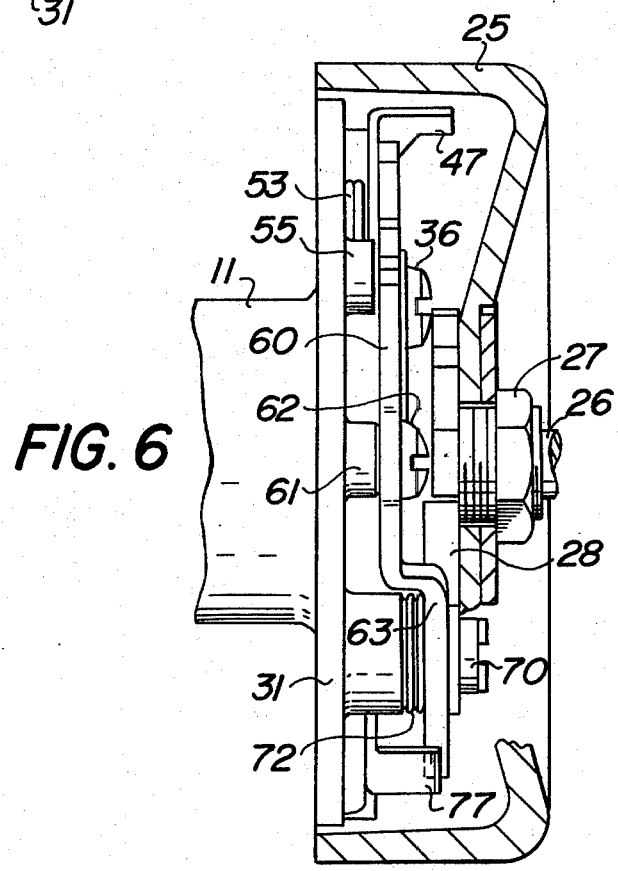
FIG. 6 is a vertical sectional view taken approximately on the line 6—6 of FIG. 2.

The rotating member 15 has a bell like center portion 25 which is secured to a shaft 26 by nut 27 and connected to a notched rachet wheel 28 also mounted on shaft 26. The rachet wheel 28 is of conventional type shown as having six notches 29 and normally rotatable in a clockwise direction as seen in FIG. 2.

The rachet wheel 28 is spaced from plate 30 which is of generally circular configuration and is secured to a plate 31 forming part of the housing 11 by three screws 32.

The plate 31 has a dog 35 rotatably mounted thereto by screw 36 engaged with a boss 37 and with a coil spring 38 engaged with dog 35 and with a stop 40 from plate 31.

The dog 35 which will be referred to as the "silent dog" has an anti-torque spring shown as a flat leaf spring 41 secured to an arm 42 of dog 35 by rivet 43 and which engages the under surface 45 of the rachet wheel 28. The arm 42 of dog 35 is normally urged into engagement with one of the notches 29 of wheel 28 by the spring 38. The dog 35 has another arm 46 at an angle to arm 42 which can be engaged by a cam projection 47 from operator 48 which is carried on shaft 49 which extends through a boss 50 on plate 31 and through a boss 51, and with a lever 52 attached thereto.

A spring 53 is provided engaged with the operator 48 and with a boss 55 from plate 31 which spring normally urges cam 47 out of engagement with the arm 46 of dog 35.

The operator 48 has another cam projection 56 similar to cam 47 at a 180° location from the operator 48 which cam 56 can engage the rounded end 57 of an arm 60. The arm 60 is rotatably mounted to a boss 61 on plate 31 by screw 62 and has an elevated arm 63 opposite to end 57 with a pointed end 65 which can engage the arm 66 of an "audible" dog 68. The dog 68 is intended to provide a clicking audible sound when engaging rachet wheel 28, and is similar to dog 35. The dog 68 is rotatably mounted to a boss 69 on plate 31 by screw 70 and has an arm 71 urged into engagement with the notches 29 of wheel 28 by a spring 72 which engages the dog 68 and a boss 75 on plate 31.

The arm 66 of dog 68 can be engaged by a cam projection 77 from an operator 60 which is rotatably mounted to boss 81 on plate 31 by a shaft 82 which passes through another boss 83 on the other side of plate 31 and has a lever 84 engaged therewith.

A stop boss 85 is provided on plate 31 which can be engaged by the operator 80 when wheel 28 is in an out of engagement position.

The operator 80 has a projection 86 which has one end of a spring 90 engaged therewith which spring 90 has its other end engaged in a projection 91 on plate 30. The spring 90 normally urges the cam 77 into out of engagement position with the arm 66 of dog 68.

The mode of operation will now be pointed out.

In normal anti-reverse operation the dogs 35 and 68 are engaged with the notches 29 and upon rotation of rachet wheel 28 the dog 68 snaps in and out of the notches 29 emitting a loud audible click each time. Dog 35, due to the action of leaf spring 41 does not emit any sound when engaging notches 29 and the action of the dogs 35 and 68 prevents reverse movement of wheel 28. When it is desired that audible anti-reverse action be discontinued but that dog 35 remain in operation the lever 84 is moved to rotate operator 80 for shaft 82 and cam 77 which moves against arm 66 and rotates dog 68 out of engagement with notches 29.

When it is desired to permit rachet wheel 28 to rotate in reverse the lever 52 is moved to rotate shaft 49, operator 48 and engage cam 47 with arm 42 to thereby urge the arm 42 of dog 35 out of engagement with notches 29.

The rotation of operator 48 causes cam 56 to engage the end 57 of arm 60, rotate arm 60 and urge the arm 71 of dog 68 out of engagement with the notches 29 of wheel 28 so that wheel 28 can therefore reverse direction. The operation of the mechanism can continue with rotation of wheel 28 in reverse, anti-reverse with an audible sound and anti-reverse without sound as desired.

It will thus be seen that an anti-reverse mechanism has been provided with which the objects of the invention are achieved.

I claim:
1. Anti-reverse mechanism for fishing reels having a shaft contained in the reel housing attached to structure for winding and unwinding line from the reel, for restricting rotation of the structure to one direction for normal operation which includes
   a toothed wheel attached to said shaft,
   a plate extending from said housing adjacent said wheel,
   at least two dogs rotatably mounted to said plate and normally resiliently urged into engagement with said wheel,
   at least one of said dogs having spring means attached thereto to cause its engagement with said wheel to be silent,
   at least one of said dogs causing an audible sound upon engagement with said wheel during rotation thereof, and
   cam means associated with said dogs to provide for their selective disengagement from operating position with said wheel.

2. Anti-reverse mechanism for fishing reels as defined in claim 1 in which
   said spring means is a leaf spring which engages a face of the toothed wheel.

3. Anti-reverse mechanism for fishing reels as defined in claim 1 in which
   said cam means includes a resiliently urged cam projection carried by an operator mounted to said plate which selectively engages said silent dog to urge it into out of wheel engagement position.

4. Anti-reverse mechanism for fishing reels as defined in claim 3 in which
   a cam arm is provided engaged by said cam projection to urge said audible dog into out of engagement position thereby providing for reverse toothed wheel movement.

5. Anti-reverse mechanism for fishing reels as defined in claim 3 in which
   said cam means includes a cam projection which is selectively engageable with said audible dog for urging it into out of wheel engagement position.

* * * * *